July 3, 1928.
S. N. BUCHANAN
1,675,921
MEANS FOR MOUNTING ELECTRICAL FITTINGS
Filed Jan. 6, 1927
2 Sheets-Sheet 1
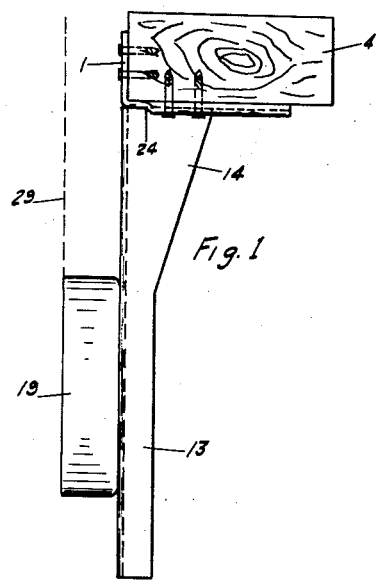
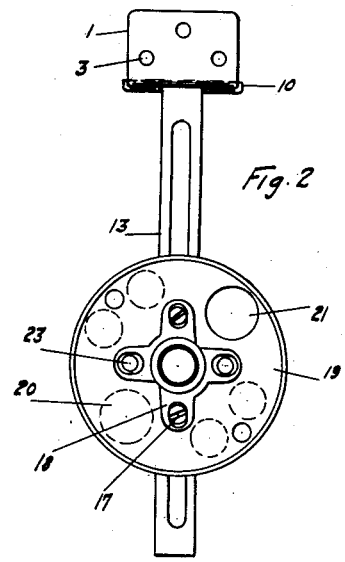
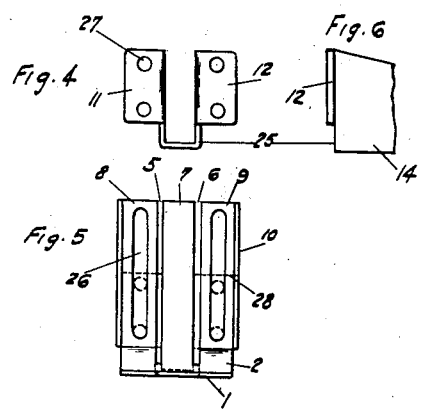
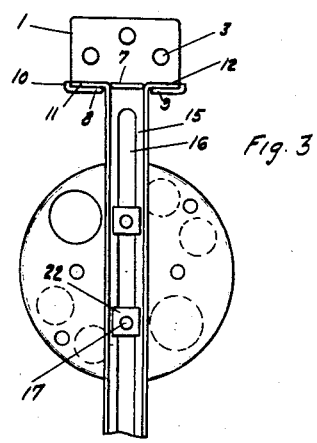
INVENTOR
STEPHEN N. BUCHANAN
BY
A. D. T. Libby
ATTORNEY July 3, 1928.  1,675,921
S. N. BUCHANAN
MEANS FOR MOUNTING ELECTRICAL FITTINGS
Filed Jan. 6, 1927  2 Sheets-Sheet 2
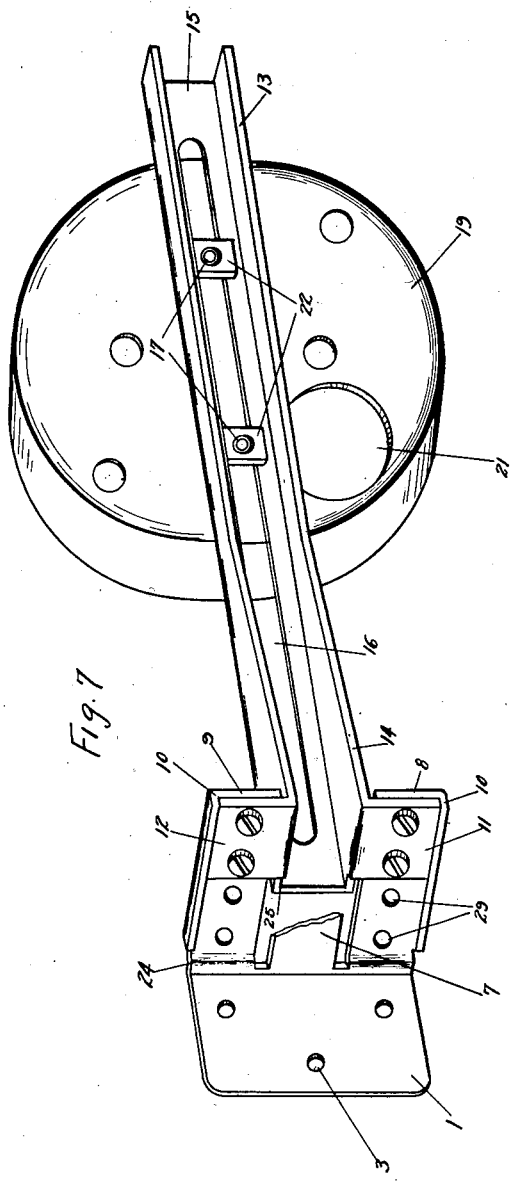
INVENTOR
STEPHEN N. BUCHANAN.
BY
A. D. T. Libby
ATTORNEY

Patented July 3, 1928.

1,675,921

UNITED STATES PATENT OFFICE.

STEPHEN N. BUCHANAN, OF NEW YORK, N. Y., ASSIGNOR TO THE THOMAS & BETTS CO., OF ELIZABETH, NEW JERSEY, A CORPORATION OF NEW JERSEY.

MEANS FOR MOUNTING ELECTRICAL FITTINGS.

Application filed January 6, 1927. Serial No. 159,439.

This invention relates to means for mounting an electrical fitting, which may take any one of several designs, by way of illustration, but not of limitation, an outlet box for an electric light fixture is illustrated and described.

It is the usual practice to do the electric light wiring in a building before any plastering is done, and consequently the junction, or outlet boxes, switch boxes etc, should be carefully positioned so that when the plastering or finishing is done, these electric fittings may be in their proper position. In wooden buildings these fittings are usually nailed to some convenient support such as one of the timbers or a board or equivalent carried by the timbers, with the result that there is no certainty that the electrical fittings referred to above will be properly located.

It is therefore the principal object of my invention to provide means for mounting these fittings, which mounting means insures that the fittings and adjustments provided may be quickly brought into proper positions, if not already there when the finishing operations on the building are being performed.

Another object of my invention, is to provide mounting means of such a character as will sustain considerable strain without becoming misplaced. These and other objects will be apparent from a reading of the specification taken in connection with the annexed drawing, in which figure 1 is a side view on a reduced scale of the mounting means showing how it may be used as a wall mounting.

Figure 2 is a plan view on the same scale as Figure 1 of the mounting means and shows the same in position for mounting the electrical fitting on the ceiling.

Figure 3 is a view of Figure 2 on the same scale looking in the reverse direction, with the mounting arm cut off and the outlet box in a different position on the arm.

Figure 4 is an end view of that part of the mounting arm adapted to engage the mounting bracket.

Figure 5 is a view of the bracket shown in position to receive the end of the arm illustrated in Figure 4.

Figure 6 is a fragmentary side view of Figure 4. While Figure 7 is a combined perspective and isometric view of the fitting with the bracket tongue broken off.

Referring now to the details wherein like numbers refer to corresponding parts in the various views, the bracket is divided into two portions 1 and 2, formed substantially at right angles, to one another. The part 1 is provided with a plurality of holes 3, through which nails may be driven into a support member 4. The portion 2 of the bracket is provided with a pair of slots 5 and 6 which extend downwardly to the portion 1 of the bracket. The slots 5 and 6 which are formed in the portion 2 of the bracket are disposed on opposite sides of a central member or tongue 7, and the side members 8 and 9 preferably have their outer edge 10 formed inwardly so as to act as strengthening members and guides for the flanges 11 and 12 of the arm 13.

The arm 13 is preferably in the form of a channel, the sides at one end being turned outwardly to form the flanges referred to. Preferably also the arm 13 has its sides increased in width at the end where the arm engages the bracket as shown in Figure 1. This construction materially strengthens the arm, and at the same time provides material for forming wider flanges than could otherwise be obtained.

The web portion 15 of the channel arm is slotted at 16, for the major portion of its length and the slot 16 is adapted to carry screws 17, which pass through the legs 18 of a fitting carried within the interior of the outlet box 19. The outlet box 19 is of usual construction having parts 20 which may be readily knocked out as indicated by the hole 21 to receive an electrical conduit through which wires are brought into the outlet box, and into the fixture by way of the fitting 18. Incidentally it may be mentioned that the screws 17, are provided with nuts 22 which are positioned within the channel arm.

As shown in Figure 2, the same pair of screws 17 that hold the fitting 18 in position within the box 19, also serve to hold the box to the arm 13. Additional screws may be used to hold the fitting 18 to the box 19, which screws may pass through the holes 23. From what has been said it is apparent that the outlet box 19 carrying the fitting 18 may be adjusted to any desired position along the arm 13.

Coming back now to the engagement between the arm and the bracket, the side members 8 and 9 are offset slightly at a point 24, see Figure 1, from the tongue 7, so that when the side members of the end of the arm are pushed downwardly into the slots 5 and 6, the flanges 11 and 12, lap over the side members 8 and 9 and the tongue 7 abuts against the end 25 of the web of the channel shaped arm, and extends between the flanges 11 and 12, which therefore hold the tongue from being bent laterally. The members 8 and 9 are preferably slotted as at 26, for the purpose of receiving screws or nails through the holes 27 in the flanges 11 and 12, but a multiplicity of holes 29 in said members 8 and 9 may be used as shown in Figure 7, as an equivalent to slots 26. When the end of the arm is in engagement with the bracket the parts take the position as shown by the dotted line 28, in Figure 5, that is to say the dotted line 28 in Figure 5, shows the arm in its lowermost adjustable position on the bracket, as indicated also in Figure 1; or as shown in Figure 7 where the arm is in its uppermost position on the bracket. The width of the inturned edges 10 is preferably slightly more than the thickness of the flanges 11 and 12, so that when the bracket is put against a support as shown in Figure 1, the support engages these inturned edges as well as the tongue 7, leaving preferably however a slight clearance over the flanges 11 and 12 whereby the arm may be adjustable forward and back, by means of the slots 26, so that the edge of the outlet box 19 may be brought flush with the finish line 29. When the arm 13 has been set to the proper position with respect to the finish line 29, it is secured in position by a screw or a nail driven through the hole 27 and the slot 26, into the support member 4.

By having the support member 4, engaging the tongue as indicated, a relatively large weight may be applied to the arm without any danger of displacing the arm from its position on the bracket. The tongue 7 abutting against the portion 25 of the arm 13, prevents the end of the arm from cutting into the support 4.

It is to be understood that the parts are metal, preferably steel, treated to prevent rusting.

It will be appreciated that the details of my invention may be varied without departing from the spirit of the same and the scope of the appended claims.

Having thus described my invention, what I claim is:

1. Means for mounting an electrical fitting comprising; a bracket and an arm adjustably carried on the bracket, said bracket having a part for attaching to a support and another part consisting of two side members and a tongue spaced between the side members, said arm having portions passing through the spaces on both sides of the tongue and terminating in flanges overlying said side members, said arm further being provided with means for longitudinally adjustably mounting said fitting thereon.

2. Means for mounting an electrical fitting, comprising; a bracket and an arm adjustably carried on the bracket, said bracket having a part for attaching to a support and another part consisting of two side members and a tongue spaced between the side members, said side members and tongue being offset so as to lie in different planes, said arm having portions passing through the spaces on both sides of the tongue and terminating in flanges overlying said side members, said flanges preferably being in thickness equal to the amount of said offset for the purpose described, said arm further being provided with means for longitudinally adjustably mounting said fitting thereon.

3. Means for mounting an electrical fitting comprising; a bracket and an arm adjustably carried on the bracket, said bracket having a part for attaching to a support and another part consisting of two side members, and a tongue spaced between the side members, said side members and tongue being offset so as to lie in different planes, said arm being channel shaped and having at one end the sides of the channel bent to form flanges adapted to lie over said side members while the web of the arm abuts against the tongue when the arm is in position on the bracket, said arm having a slot in the web and means carried by the arm and passing through said slot for adjustably mounting an electrical fitting thereon.

4. Means for mounting an electrical fitting comprising; a bracket and an arm adjustably carried on the bracket, said bracket having a part for attaching to a support and another part consisting of two side members having their outer edges turned inward toward the first mentioned part and a tongue spaced between the side members, said arm having parts positioned in the spaces between the side members and terminating in flanges overlying the side members and extending into guiding relationship with said inturned edges, said arm further being provided with means for longitudinally adjustably mounting said fitting thereon.

5. Means for mounting an electrical fitting comprising; a bracket having two parts bent substantially at right angles to each other, means associated with one part for mounting the bracket to a support, the other part having a tongue and two side members each spaced from the tongue by a slot, a channel shaped arm having a portion of its base removed adjacent one end and having its sides adjacent said end passing through said slots and bent over the side members, while the web of the arm bears against the tongue, said arm and side members having cooperative means for adjusting the relative position of the arm thereon, said arm further being provided with means for longitudinally adjustably mounting said fitting thereon.

6. Means for mounting an electrical fitting comprising; a bracket having two parts bent substantially at right angles to each other, means associated with one part for mounting the bracket to a support, the other part having a tongue and two side members each spaced from the tongue by a slot, said side members having their outer edges turned inwardly to assist in guiding and supporting an arm, a channel shaped arm having its sides at one end terminating in flanges, said sides fitting in said slots of the bracket and the flanges fitting over the side members and extending into cooperative relationship with said inturned edges of the side members while the web of the arm bears against the tongue, means for adjustably fastening the arm to said side members and the support, said arm further being provided with means for longitudinally adjustably mounting said fitting thereon.

7. Means for mounting an electrical fitting comprising; a bracket having two parts bent substantially at right angles to each other, means associated with one part for mounting the bracket to a support, the other part having a tongue and two side members each spaced from the tongue by a slot, said side members having their outer edges turned inwardly to form guideways for a support arm, a channel shaped arm having its sides wider at one end than the other and these sides at said one end for the major portion of their width bent outwardly forming flanges, said sides fitting in said slots of the bracket and the flanges fitting over the side members and extending into cooperative relationship with said inturned edges of the side members, while the web of the arm bears against the tongue, means for adjustably fastening the arm to said side member and the support, said arm further being provided with means for longitudinally adjustably mounting said fitting thereon.

8. Means for mounting an electrical fitting comprising; a bracket and an arm adjustably carried on the bracket, said arm being channel shaped and having its sides at one end bent outwardly into flanges, said bracket having a pair of slots therein forming a tongue which is adapted to bear against the end of the web of the arm and extend between said flanges, when the sides of the arm are inserted into said slots whereby said flanges extend over other portions of the bracket adjacent said slots, said arm having means for longitudinally adjustably mounting said electrical fitting thereon, said bracket having means for fastening it as well as the arm to a support.

9. Means for mounting an electrical fitting comprising; a bracket having two parts bent substantially at right angles to each other, means associated with one part for mounting the bracket to a support, a channel shaped arm having its sides at one end terminating in outwardly bent flanges, means for slidably mounting the arm on the other part of the bracket, said means consisting of a tongue and a pair of side members slightly offset from the tongue and spaced therefrom by a pair of slots adapted to receive the sides of the arm at the point where they turn into the flanges, said flanges overlying the side members, and the tongue bearing against the web of the arm and extending between the flanges, said side members having inwardly turned edges slightly wider than the thickness of said flanges, whereby when the bracket is fastened to a support which overlies said side members the arm may be adjusted, means for fastening the arm in adjusted position and means associated with the arm for longitudinally adjustably mounting said fitting thereon.

10. Means for mounting an electrical fitting comprising; a bracket having two parts bent at an angle, so both parts will engage a support, one of said parts being slotted to form a tongue and two side members, said side members having their outer edges turned toward the support for the purposes described, a channel shaped arm having the sides at one end turned into flanges which are adapted to lie over said side members when the sides of the arm are placed in the slots, fastening means for said side members and flanges, said side members and the flanges having cooperating means to receive said fastening means for fastening both to the support after the arm has been moved in the bracket slots to the desired position said tongue being then pressed against the web of the arm and held securely between said flanges and means associated with the arm for longitudinally adjustably mounting said fitting thereon.

11. Means for mounting an electrical fitting comprising; an angle bracket adapted to have both parts fastened to a support, a channel arm having means longitudinally adjustably mounting said fitting thereon, means for locking said arm on the bracket in a desired adjusted position consisting of, a tongue and two side members adjacent thereto formed in one portion of the bracket, a pair of flanges on the end of the arm adapted to receive the tongue therebetween so the tongue rests against the web of the arm, and said flanges overlie said side members and fastening means to hold the side members and flanges securely together and to the support.

12. Means for mounting an electrical fitting comprising; an angle bracket adapted to have one part fastened directly to a support, an arm having means for slidably carrying said electrical fitting thereon, means for fastening said arm to the bracket in a desired position consisting of; flanges on the arm overlying and slidably on portions of the bracket between it and the support, fastening means cooperating between said flanges and the bracket to secure them together, said bracket portions and the flanges being provided with means for receiving said fastening means going therethrough into the support; and means for preventing the end of the arm adjacent said flanges from cutting into the support and for aiding in supporting the arm on the bracket, said last mentioned means comprising a tongue on the bracket extending between said flanges on the arm and held by the support against said end of the arm adjacent the flanges.

In testimony whereof I affix my signature.

STEPHEN N. BUCHANAN.